United States Patent Office 2,782,168
Patented Feb. 19, 1957

2,782,168

PREPARING LUMINESCENT MATERIALS

Cecil R. Fetters, Toledo, Ohio, assignor to Libbey-Owens-Ford Glass Company, Toledo, Ohio, a corporation of Ohio No Drawing. Application July 15, 1953,
Serial No. 368,219

3 Claims. (Cl. 252—301.4)

The present invention relates to the preparation of luminescent materials or phosphors, and more particularly to the preparation of electroluminescent phospors.

Zinc sulfide, zinc-cadmium sulfide, other sulfides, and zinc-sulfide selenide, when activated with copper, silver, gold, manganese, lead, or other metals, have been used as phosphors in cathode ray tubes, television tubes, oscilloscopes and tuning indicators. More recently certain of these phosphors have also been suggested for use in electroluminescent lighting in which light is produced by the direct action of an electric field on a phosphor that is electroluminescent.

It is the primary aim of this invention to provide an improved method of preparing phosphors, including electroluminescent phosphors.

Heretofore, in the manufacture of phosphors the phosphor base has been treated with an aqueous solution of a salt of the activating element, a flux was usually but not necessarily added, and the mixture dried, after which the whole was fired at elevated temperatures for an extended period. It has been generally preferred that the firing or heating operation be carried out in an inert atmosphere or even in a reducing atmosphere, and to this end it has been customary to introduce into the heating furnace an inert gas (such as helium or nitrogen), or a reducing gas (such as hydrogen, carbon monoxide, or various hydrocarbons or mixtures thereof).

An important object of the present invention is the provision of an improved method of producing phosphors in which the necessity for drying the powdered materials prior to firing is eliminated.

Still another object is to provide a method of this same general character in which the materials being fired are surrounded with an inactive or reducing, protective atmosphere without the necessity of bringing special gases into the heating furnace.

Briefly stated, these and the further objects and advantages of the invention which will become more apparent hereinafter, are accomplished by firing a moist mixture of the phosphor making ingredients in a closed container and utilizing the reaction of an ingredient of the moist mixture under the firing heat to provide the desired protective atmosphere.

To explain, one preferred way of practicing the invention is to employ, as a solvent for the activating compound, a liquid which at the firing temperatures for the phosphor (roughly 900 to 1200° centigrade) will at least partially decompose to form protective gases of the desired character. For example, alchohols at such temperatures form hydrogen, carbon monoxide, hydrocarbons and other reducing or inert gases; and I have found that, by dissolving proper proportions of an activating metal in the form of one of its compounds in a small amount of alcohol before incorporating the activating material with the phosphor base, very desirable results are attained in the actual phosphor making procedure.

According to the invention such a procedure may consist in incorporating the solution of the activating material with the phosphor base by suitable mixing, followed by placing the moist mixture into a heat resisting crucible, and then covering the crucible with a well-fitting lid and introducing it into a furnace, preferably of the muffle type, to fire the mixture.

Although excess gases may escape from the covered crucible, it will be found that sufficient amounts remain to provide a completely satisfactory reducing or protective atmosphere.

In choosing the alcohol in which to dissolve the activating metal compound, I have found the aliphatic alcohols, and particularly the lower aliphatic alcohols such as ethyl, methyl, propyl, butyl and amyl alcohol, to be generally best suited for the purpose, with ethyl and methyl alcohol being preferred because of their generally better solvent properties for the activator.

It is, of course, to be understood that the present invention is in no way restricted to use with any particular phosphor base or activator, or in connection with the making of any particular phosphor. However, the manner of practicing the invention in connection with the production of one particular phosphor is specifically disclosed in the following example:

To 50 grams of dry luminescent pure zinc sulfide, approximately 10 cc. of an alcoholic copper salt solution containing 0.015 gram by weight of copper as an activator was added. After thorough mixing, the moist mixture was placed in a covered silica crucible of 50 milliliter size so that none of the mixture was in contact with the lid during the firing process. The mixture was then fired by placing the crucible in a furnace for 1¼ hours at 1040° C. and, during this time, the alcohol on partial combustion provided a reducing layer of gases within the crucible which enveloped the mixture during the firing process. Upon removal of the crucible from the furnace, it was allowed to cool in an atmosphere of helium before removal of the lid to protect the contents of the crucible from an oxidizing atmosphere for as long as possible.

In additional examples, the invention was similarly applied to the making of phosphors by employing zinc sulphide as the phosphor base and activating the base with copper and lead, copper and silver, copper and manganese, silver, copper-lead-manganese, gold, copper and gold, and copper and aluminum; and by employing zinc-cadmium sulphide as the phosphor base and activating it with copper and with silver. Good results were obtained in each case.

Where, in dealing with amounts of phosphor base material and a crucible size as set forth in the first example above, it is desired to employ different amounts of activator to obtain different characteristics in the phosphor, this should be done by making the activator solution more concentrated or more dilute while maintaining the amount of alcohol at approximately 10 cc. which gives the preferred consistency and volume in this mixture. This is important because where a materially greater amount of alcohol is used with such a mixture and crucible size the lid will be raised and rapid combustion of the alcohol will take place.

Where desired, a flux may be added to the phosphor base-activator mixture before firing to facilitate and expedite distribution of the materials in the mixture, and a halogen of any of the alkali metals is satisfactory for this purpose.

After removal from the furnace, the covered crucible may be cooled in air, if desired, prior to removal of the lid. Any slight coating of the oxide of zinc which may form on the surface of the contents while cooling in air may be easily removed by well known and standard procedures while observing the phosphor under ultra-violet light in a darkened room.

It is to be understood that the forms of the invention herewith described are to be taken as illustrative embodiments only of the same, and that various compositional changes may be resorted to without departing from the spirit of the invention or the scope of the subjoined claims.

I claim:

1. In a method of making phosphors in which a phosphor base is treated with an activator and then fired, the steps of dissolving the activating material in a liquid aliphatic alcohol that will at least partially decompose at the firing temperature to release non-oxidizing gases, mixing the solution of activating material with a phosphor base to form a moist mixture, and then heating said moist mixture to the firing temperature in a closed container.

2. In a method of making phosphors in which a phosphor base is treated with an activator and then fired, the steps of dissolving the activating material in a lower aliphatic alcohol, mixing the solution of activating material with a phosphor base to form a moist mixture, and then heating said moist mixture to the firing temperature in a closed container.

3. In a method of making phosphors in which a phosphor base is treated with an activator and then fired, the steps of dissolving the activating material in methyl alcohol, mixing the methyl alcohol solution with the phosphor base to form a moist mixture, and then firing said moist mixture in a closed container.

References Cited in the file of this patent

UNITED STATES PATENTS

| | | |
|---|---|---|
| 2,126,233 | Wakenhut | Aug. 9, 1938 |
| 2,324,843 | Hultgren | July 20, 1943 |
| 2,405,031 | Goodman | July 30, 1946 |
| 2,421,207 | Leverenz | May 27, 1947 |
| 2,447,322 | Fonda | Aug. 17, 1948 |
| 2,647,086 | Homer | July 28, 1953 |